Feb. 18, 1969
E. C. LOWE
3,428,076
HIGH PRESSURE VALVE
Filed Jan. 9, 1967
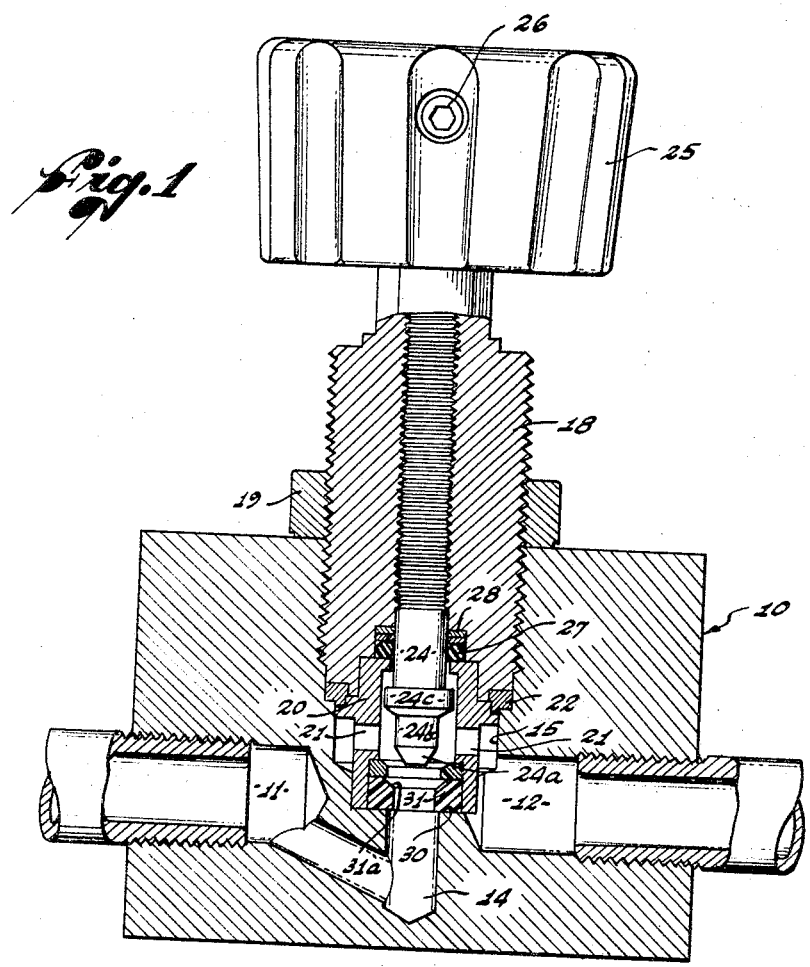
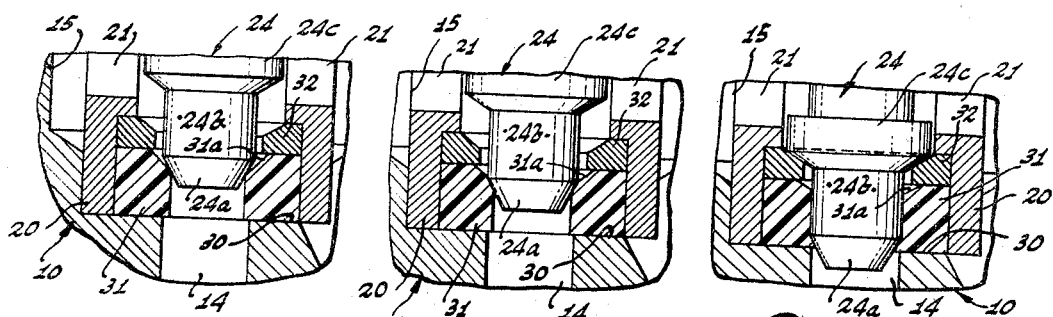
INVENTOR.
BY *Edwin C. Lowe*
*Forrest J. Lilly*
ATTORNEY

United States Patent Office 3,428,076
Patented Feb. 18, 1969

3,428,076
HIGH PRESSURE VALVE
Edwin C. Lowe, Van Nuys, Calif., assignor to Robbins Aviation, Inc., Vernon, Calif., a corporation of California
Filed Jan. 9, 1967, Ser. No. 608,123
U.S. Cl. 137—329.05
Int. Cl. F16k *1/36, 1/02, 51/00*
4 Claims

ABSTRACT OF THE DISCLOSURE

A valve for very high pressure fluid lines has a seat of high tensile strength plastics material and a tapered metal spindle seating against it. The seat is deformable, but the material is elastic to a degree and returns, at least to some extent, to its original shape after pressure on the seat is released.

Background of the invention

The present invention relates generally to valves, and especially to valves designed particularly to control fluid flow in very high pressure lines, that is, fluid pressures in the neighborhood of 10,000 p.s.i., or higher. Valves of this general character are disclosed in Patents Nos. 2,994,343 and 3,160,390, issued to George W. Banks, to which reference may be made for additional discussion of the problems and desirable characteristics of valves handling very high pressure fluids.

Modern developments in many fields of technology have increased the pressures in commonly used fluid systems, such as control systems and fuel systems. Many advantages flow from the use of higher fluid pressures, such as reduction in space or weight of the system. In such systems, valves are required to control the flow; and previously known designs of valves are, in many cases, not suited to the very high pressures now encountered in many places. Fluid pressures frequently reach values as high as 10,000 p.s.i., and the trend is toward increasing pressures as rapidly as system components can be satisfactorily developed.

In valves for this type of duty, it is highly desirable to have smooth operation of the valve with low torque in order to regulate fluid flows smoothly and accurately. The low torque required to actuate the valve enables small movements of the valve to be made accurately and without over-travel, thus eliminating surges or irregular flow in the fluid system.

Obviously, another characteristic of such valve should be the ability to seal off the high pressure fluids so that there is zero leakage of fluid when the valve is closed. This phase of valve operation can be most effectively achieved by seating a hardened valve member against a comparatively softer, deformable valve seat.

The deformable nature of the valve seat results in a comparatively large amount of wear on the seat from repeated operations of the valve. A consequence is that the valve seat should be replaceable, preferably by a simple disassembly of the valve parts without disconnecting the valve from the fluid lines. Furthermore, the engaging surfaces of the valve and seat must come into intimate contact, a condition that would be no longer possible if the valve member became scored or damaged by contact with other metallic members. Accordingly, it is desirable that the travel of the valve member be controlled or limited in such a way that the maximum range of movement of the valve member with respect to the seat is not sufficient to produce any harmful contact between the valve member and any portion of the valve body.

Thus, it is a general object of the present invention to design a valve suitable for handling fluids under very high pressures and in which these several advantages, as well as others, are present in a single valve structure to the maximum degree that they are compatible with each other.

Summary of the invention

The above objects and advantages of the present invention, as well as others not specifically mentioned, are attained in a valve for high pressure fluid having a metal body provided with fluid inlet and outlet openings connected by a fluid passage through the body, a replaceable valve seat in the passage, and a movable valve member which moves toward and away from the seat in order to regulate fluid flow through the passage. The valve seat is provided by a body of high tensile strength plastics material having physical properties similar to those of polyfluoro-chlorocarbons, a preferred material for this purpose being a trifluoro-chloroethylene polymer or equivalent which has a tensile strength in excess of 4,500 p.s.i. The body is provided with a central opening of circular cross section extending through the body; and preferably the central opening has a beveled surface opposed to the valve member. The movable valve member is circular in cross section and has a tapered surface on the leading edge and engages the seat with a fluid tight fit. The included angle of the tapered end of the valve member is less than the included angle of the bevel of the valve seat in a preferred embodiment.

The valve seat material is deformable in response to pressure applied to it by the valve member; but the material selected has a sufficient degree of resilience or elasticity that it returns, at least part way, to its original shape after the presssure applied by the valve member is released. Consequently, the deformable valve seat engages the valve member with a fluid tight fit when the valve is closed. However, since some residual deformation remains after each complete cycle of operation, the valve seat continually retreats in the direction of movement of the valve member towards the seat, thereby providing a renewable seating surface on the seat. Ultimately, the valve member engages a hardened surface which limits the forward travel of the valve member to prevent travel of the valve member into contact with other metal portions of the valve body.

Brief description of the drawing

How the various advantages and objects of the present invention are achieved, will be more readily apparent by reference to the following description and to the annexed drawing, in which:

FIGURE 1 is a longitudinal median section through a valve embodying the present invention;

FIGURE 2 is an enlarged fragmentary median section similar to FIGURE 1 showing the valve seat and the leading end of the spindle in a position of initial contact with the valve seat; and FIGURES 3 and 4 are views similar to FIGURE 2 showing the spindle in successive positions of greater advance relative to the valve seat.

Description of a preferred embodiment

Referring now to the drawing, the valve body is indicated generally at 10. The body is normally made of metal to attain the desired strength. At opposite sides, body 10 is provided with openings 11 and 12 which are preferably fluid inlet and outlet openings, respectively. These openings are shown as internally threaded in order to receive a threaded pipe, but such is merely exemplary of the various means for connecting fluid conduits to the body. Any other suitable type of fitting may be substituted.

Openings 11 and 12 are interconnected by a fluid passage extending through the body, such passage comprising an angular section 14 which communicates at one end with valve chamber 15 within the body. The chamber is also in communication with the other opening.

Valve chamber 15 is at the end of a recess in body 10 which is in part internally threaded in order to receive spindle barrel 18 which is externally threaded. The barrel is preferably held in place by lock nut 19 which is screwed onto the barrel threads and tightened against the upper face of body 10.

Located within valve chamber 15 and held therein by barrel 18 is the seat cage 20 which is a generally cylindrical member open at both ends and provided with side ports 21. The open lower end receives fluid from passage 14, such fluid then leaving the interior of cage 20 through ports 21 to flow into chamber 15 and thence into the outlet 12. The lower end of valve chamber 15 is made concentric with fluid passage 14 so that the cage fits accurately in place with respect to fluid passage 14. The cage is inserted and removed with barrel 18, as will become evident, and is held in place by the barrel. A fluid seal is provided at 22 at the lower end of the barrel. While this seal may be of any suitable type, it typically is of a deformable material which cold flows into intimate contact with the wall of the valve chamber under pressure applied to this seal by the end surface of spindle barrel 18.

Valve spindle 24 is externally threaded and is received within an internally threaded bore coaxial of barrel 18. The leading or forward end of spindle 24 is the movable valve member which, upon rotation thereof, moves toward and away from the valve seat in order to regulate fluid flow through the valve. At its outer end, spindle 24 is provided with a handle 25 by means of which the spindle is turned manually, the handle being mounted on the spindle non-rotatably by set screw 26, or other suitable means. Near the lower end of barrel 18, fluid seal means is provided against the spindle in the form of one or more O-rings 27 which are located in a recess in the barrel concentric with the spindle. Typically, the recess is closed at one side by the upper end of seat cage 20 to confine the O-ring. On the other side, O-ring 27 is held by one or more back-up rings 28 which may also be adapted to retain a suitable lubricant. Rings 28 at this position hold the O-ring against extrusion under the high fluid pressures to which it is exposed on the side toward valve chamber 15.

Around passage 14 where it opens into valve chamber 15, the larger diameter of the valve chamber provides an inwardly facing shoulder 30 upon which rests valve seat 31. Valve seat 31 is of cylindrical exterior shape and fits snugly within the lower end of seat cage 20 which confines the seat laterally against a radial expansion.

Similarly, shoulder 30 of metal body 10 extends over substantially the full area of the lower face of seat body 31 to support the body in place and confine it against axial expansion or deformation. The upper side of body 30 is confined by a metal retaining ring 32 which fits snugly between the seat and an overhanging shoulder on seat cage 20.

Valve seat 31 has a central opening of circular cross-section which is located concentrically with fluid passage 14 and is preferably of slightly smaller diameter than passage 14. Likewise, the central opening in seat 31 is located concentrically with spindle 24 in order that the seat may be engaged by the leading end of the spindle when it is moved toward seat 31 by rotation of the handle.

Valve seat 31 is provided by a body of one of the synthetic plastics materials belonging to the group of polyfluorocarbons. The preferred material is a fluoro-chloro-ethylene or a trifluoro-chloroethylene polymer, marketed under the name "Kel-F," because of its high tensile strength. This material has a tensile strength in the range of 4,500–5,500 p.s.i.; and for the present purposes, the high tensile strength is utilized to advantage since the greater the tensile strength of the valve seat, the higher the fluid pressure that can be held without shearing or tearing the valve seat. For example, it has been found that with a fluorochloroethylene polymer having a tensile strength of approximately 5,000 p.s.i., a fluid pressure of 10,000 p.s.i. can be safely handled by a valve constructed according to the present invention.

The relatively high tensile strength of this material gives it a relatively high hardness, for synthetic plastics, typically a hardness of about Rockwell 85.

The modulus of elasticity of fluorochloroethylene is generally given as 185,000 p.s.i. or more. This indicates that the material is easily deformable but at the same time has a substantial degree of elasticity which causes it to return, at least partially, to its initial shape after being deformed. Polyfluorohydrocarbons have a capability of cold flow under pressure, this characteristic being used to conform them under pressure to a surface to effect a fluid seal therewith. In the present instance, the elastic capability of the material to return toward its original shape, as opposed to a highly ductile, non-elastic material such as lead, creates an intimate contact between the movable valve member or spindle and the seat which is not possible with substantially nonelastic material. Thus, the seal effected with plastics of this character is superior to anything that can be obtained with a nonelastic material.

A polymer of this character is often spoken of in the industry as "having a memory" because recovery from elastic deformation is composed of an immediate elastic recovery followed by a retarded elastic recovery that may extend over a considerable period of time. Of course, nonrecoverable deformation occurs when the stress exceeds the yield point, so that a given deformation may disappear either partly or entirely depending on magnitude.

As may be seen best in FIGURE 2, the leading end of spindle 24 is tapered at 24a. Also, the valve seat is beveled at 31a around a central opening through the seat. The included angle of the taper 24a is less than the included angle of bevel 31a with the result that when the spindle is moved toward the valve seat, initial contact of the spindle with the valve seat is essentially at the corner between bevel 31a and the cylindrical portion of the opening in the seat. This establishes what may be termed a line contact between the spindle and the seat. Actually, the same relation exists without bevel 31a and only a radial surface on the top of the valve seat body.

Further advance of the spindle from the position of FIGURE 2 to the position of FIGURE 3 deforms the seat material and establishes contact over a narrow annular area which is initially limited to the tapered surface 24a of the spindle. Because of the elastic nature of the material of the valve seat, it tends to press into contact with the spindle when deformed by pressure from the spindle and maintains an intimate contact with the spindle which insures a fluid tight fit or seal between the spindle and seat.

Because of the limited elasticity of the seat material, continued cycles of opening and closing the valve produce an increasing or a cumulative deformation of the seat that is permanent. As a consequence, each time the spindle is closed, it moves further into the seat, the rate of penetration depending upon several factors. The area of contact on the seat retreats, in effect, along the axis of the central bore through the seat but a sealing relationship is continually reestablished at a new location or new sealing area. After a while, the cylindrical surface 24b on the spindle which follows the tapered surface 24a, comes into contact with the seat material as illustrated in FIGURE 4.

Eventually, the penetration of the spindle into the seat reaches a point where travel of the spindle is halted by engagement of the enlarged diameter portion 24c with the face of retainer ring 32. When this occurs, the spindle and retainer ring both being rigid materials, the spindle cannot advance further, and it is an indication that the valve seat is worn out and should be replaced. It will be noted that in FIGURE 4 the parts are so dimensioned that the spindle is stopped by retainer 32 short of contact with metal body 10, which would otherwise take place since the fluid passage 14 is of smaller diameter than cylindrical section 24b of the spindle. Stopping the spindle short of engagement with the body prevents harmful engagement between the spindle and body which would mar or roughen the spindle surface and prevent it from effectively sealing with seat 31.

I claim:

1. A valve for high pressure fluids having a metal body provided with fluid inlet and outlet openings connected by a fluid passage in the body, a valve seat in the passage, and a movable valve member movable toward and away from the seat to regulate fluid flow in the passage, characterized by the improvement wherein:

the valve seat is provided by a body of high tensile strength plastics material having physical properties similar to those of polyfluorochlorocarbons, said seat having a circular central opening extending through the seat;

and the movable valve member is of circular cross-section and has a tapered surface on the leading end that engages the seat with a fluid-tight fit, the tapered surface being followed by an adjoining cylindrical surface of a diameter larger than the initial diameter of the central opening in said seat but of a size to penetrate the seat opening to bring the tapered surface into sealing engagement with the seat at a plurality of progressive positions.

2. A valve according to claim 1 in which the valve seat is beveled and the included angle of the tapered end of the valve member is less than the included angle of the beveled surface of the valve seat.

3. A valve according to claim 1 which also includes means confining the seat body over substantially three contiguous sides that includes a removable annular metal retainer engaging and confining the seat body on one side, the retainer having a central opening larger than the cylindrical portion of the movable valve member and through which the cylindrical portion of the valve member passes with clearance to engage the valve seat.

4. A valve for high pressure fluids having a metal body provided with fluid inlet and outlet openings connected by a fluid passage in the body, a valve seat in the passage, and a movable metal valve member movable into and out of contact with the seat to regulate fluid flow in the passage, characterized by the improvement wherein:

the valve seat is an annular member of high tensile strength deformable plastics material having limited elasticity;

said valve seat having a central opening and being supported on one face and around the periphery by the valve body concentrically of an opening therein which is substantially the same diameter as the opening in the seat;

the movable member has at the leading end a tapered surface progressing from a first diameter smaller than the opening in the valve seat to a second diameter larger than the opening in the valve seat followed by a cylindrical section of said second diameter and followed in turn by a shoulder at a section of a still larger third diameter;

and an annular metal retainer engaging the seat on the side away from that side engaging the metal body, the central opening in the retainer having a diameter larger than said second diameter but less than the third diameter to allow the cylindrical section to pass through the retainer, the axial length of the cylindrical section of the movable valve member being such that the valve member is stopped short of contact with the metal valve body when fully advanced into engagement at said shoulder with the metal retainer.

References Cited

UNITED STATES PATENTS

| 3,071,344 | 1/1963 | Banks | 251—333 X |
| 3,145,010 | 8/1964 | Karr | 251—210 |
| 3,365,166 | 1/1968 | Smith | 251—122 X |

FOREIGN PATENTS 1,042,316  9/1966  Great Britain.

ARNOLD ROSENTHAL, *Primary Examiner.*

U.S. Cl. X.R.

251—333